US012682820B1

(12) United States Patent
Chuang et al.

(10) Patent No.: US 12,682,820 B1
(45) Date of Patent: Jul. 14, 2026

(54) DISPLAY DRIVING CIRCUIT AND DISPLAY DRIVING METHOD

(71) Applicant: HIMAX TECHNOLOGIES LIMITED, Tainan City (TW)

(72) Inventors: Tsung-Lin Chuang, Tainan City (TW); Chuan-Chien Hsu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/019,463

(22) Filed: Jan. 14, 2025

(51) Int. Cl.
*G09G 3/20* (2006.01)

(52) U.S. Cl.
CPC ....... *G09G 3/2092* (2013.01); *G09G 2310/08* (2013.01); *G09G 2330/025* (2013.01)

(58) Field of Classification Search
CPC ............. G09G 3/2092; G09G 2310/08; G09G 2330/025
See application file for complete search history.

(56) References Cited

U.S. PATENT DOCUMENTS 8,786,641 B2 * 7/2014 Tso ....................... H03M 1/765 345/55
8,872,748 B2 * 10/2014 Cho ..................... G09G 3/3688 345/98
9,190,009 B2 * 11/2015 Zhu ...................... G09G 3/3696
9,558,698 B2 * 1/2017 Chen .................... G09G 3/3614
9,852,703 B2 * 12/2017 Miyake .................... G09G 5/18
10,692,418 B2 * 6/2020 Seo ...................... G09G 3/2003
10,861,406 B2 * 12/2020 Xi ........................ G09G 3/3655
10,937,350 B2 * 3/2021 Xu ....................... H03K 17/567
10,950,186 B2 * 3/2021 Hsieh ....................... G09G 3/34
10,991,329 B2 * 4/2021 Jinta .................... G09G 3/3674
11,335,291 B2 * 5/2022 Kwak .................. G09G 3/3614
11,495,189 B1 * 11/2022 Chien .................. G09G 3/3614
11,847,988 B2 * 12/2023 Lu ........................ G09G 3/3688
11,881,189 B1 * 1/2024 Sun ...................... G09G 3/3696
12,354,513 B2 * 7/2025 Lee .......................... G09G 3/20
12,394,390 B2 * 8/2025 Shigeta ................ G09G 3/3696
2007/0200815 A1 * 8/2007 Yeh ...................... G09G 3/3688 345/98
2008/0136804 A1 * 6/2008 Lee ...................... G09G 3/3655 345/96
2008/0252667 A1 * 10/2008 Tso ....................... H03M 1/765 341/144
2010/0134451 A1 * 6/2010 Cho ..................... G09G 3/3677 345/205
2011/0096050 A1 * 4/2011 Lee ...................... G09G 3/3655 345/96
(Continued)

*Primary Examiner* — Michael J Jansen, II
(74) *Attorney, Agent, or Firm* — JCIPRNET

(57) ABSTRACT

A display driving circuit and a display driving method are provided. The display driving circuit includes a controller, a common voltage supply circuit, and a border voltage supply circuit. The controller generates a plurality of border voltage control signals and a plurality of common voltage control signals. The common voltage supply circuit outputs a common voltage to the display panel according to the plurality of common voltage control signals. The border voltage supply circuit outputs a border voltage to the display panel according to the plurality of border voltage control signals. When a voltage polarity of the common voltage is reversed, the common voltage supply circuit performs charge sharing by a common ground voltage.

17 Claims, 7 Drawing Sheets

(56) References Cited

U.S. PATENT DOCUMENTS

| | | | | |
|---|---|---|---|---|
| 2011/0157131 | A1* | 6/2011 | Miyake | G09G 3/3655 345/211 |
| 2012/0081352 | A1* | 4/2012 | Yamagishi | G09G 3/3614 345/212 |
| 2012/0320018 | A1* | 12/2012 | Saitoh | G09G 3/3655 345/94 |
| 2015/0009202 | A1* | 1/2015 | Cho | G09G 3/3696 345/212 |
| 2015/0015560 | A1* | 1/2015 | Zhu | G09G 3/3614 345/212 |
| 2015/0042238 | A1* | 2/2015 | Chuang | G09G 3/3655 315/291 |
| 2015/0287374 | A1* | 10/2015 | Chen | G09G 3/3648 345/98 |
| 2018/0151138 | A1* | 5/2018 | Jinta | G09G 3/3614 |
| 2019/0043409 | A1* | 2/2019 | Seo | G09G 3/2003 |
| 2019/0206351 | A1* | 7/2019 | Xi | G09G 3/3614 |
| 2019/0244576 | A1* | 8/2019 | Kwak | G09G 3/3655 |
| 2020/0265765 | A1* | 8/2020 | Xu | H03K 17/567 |
| 2021/0027721 | A1* | 1/2021 | Hsieh | G09G 3/34 |
| 2021/0118379 | A1* | 4/2021 | Lu | G09G 3/3685 |
| 2024/0029684 | A1* | 1/2024 | Sun | G09G 3/3688 |
| 2024/0177642 | A1* | 5/2024 | Lee | G09G 3/3614 |
| 2024/0312430 | A1* | 9/2024 | Shigeta | G09G 3/3696 |

* cited by examiner

DISPLAY DRIVING CIRCUIT AND DISPLAY DRIVING METHOD

BACKGROUND

Technical Field

The disclosure relates to a device, and particularly relates to a display driving circuit and display driving method.

Description of Related Art

In the conventional technology, when a display panel is driven by a driving voltage provided by a controller, and a voltage polarity of the driving voltage is reversed, the driving voltage may generate a peak current, thus causing damage to circuit components and erroneous driving results, and affecting the display effect of the display panel.

SUMMARY

The disclosure is directed to a display driving circuit and display driving method, which are adapted to provide a better display effects.

The display driving circuit of the disclosure includes a controller, a common voltage supply circuit, and a border voltage supply circuit. The controller is configured to generate a plurality of border voltage control signals and a plurality of common voltage control signals. The common voltage supply circuit is coupled to the controller and a display panel, and configured to output a common voltage to the display panel according to the plurality of common voltage control signals. The border voltage supply circuit is coupled to the controller and the display panel, and configured to output a border voltage to the display panel according to the plurality of border voltage control signals. When the common voltage supply circuit determines that a voltage polarity of the common voltage is reversed according to the plurality of common voltage control signals, the common voltage supply circuit performs charge sharing by a common ground voltage during a common voltage polarity reversal process. When the border voltage supply circuit determines that a voltage polarity of the border voltage is reversed according to the plurality of border voltage control signals, the border voltage supply circuit performs charge sharing by a border ground voltage during a border voltage polarity reversal process.

The display driving method of the disclosure includes the following step: generating a plurality of border voltage control signals and a plurality of common voltage control signals by a controller; outputting a common voltage to the display panel according to the plurality of common voltage control signals by a common voltage supply circuit; outputting a border voltage to the display panel according to the plurality of border voltage control signals by a border voltage supply circuit; when a voltage polarity of the common voltage is reversed, performing charge sharing by a common ground voltage during a common voltage polarity reversal process; and when a voltage polarity of the border voltage is reversed, performing charge sharing by a border ground voltage during a border voltage polarity reversal process.

In summary, the display driving circuit and the display driving method of the disclosure may effectively reduce a peak current generated by a driving voltage of a display panel occurs voltage polarity reversed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
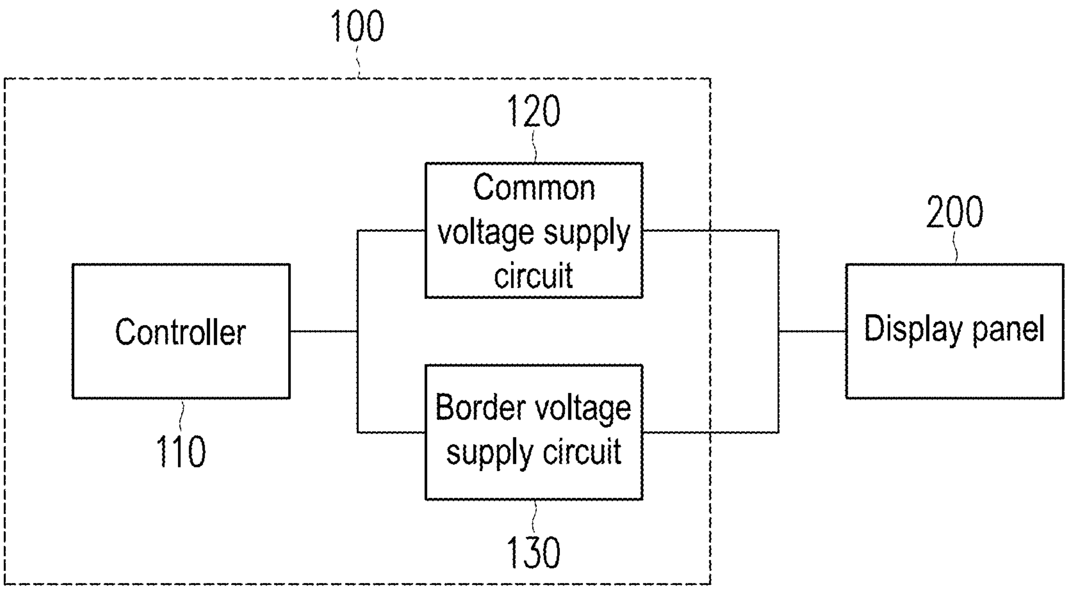
FIG. 1 is a schematic diagram of a display driving circuit according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ."

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a display driving circuit according to an embodiment of the disclosure. Referring to FIG. 1, the display driving circuit 100 includes a controller 110, a common voltage supply circuit 120, and a border voltage supply circuit 130. The controller 110 is coupled to the common voltage supply circuit 120 and the border voltage supply circuit 130. The common voltage supply circuit 120 and the border voltage supply circuit 130 are coupled to a display panel 200. In the embodiment of the disclosure, the controller 110 may provide a common ground voltage and a plurality of common voltage control signals to the common voltage supply circuit 120, and may provide a border ground voltage and a plurality of border voltage control signals to the border voltage supply circuit 130. The common voltage supply circuit 120 may generate a common voltage to the display panel 200, and the border voltage supply circuit 130 may generate a border voltage to the display panel 200.

In one embodiment of the disclosure, the display panel 200 may be a color e-paper display panel or an electrophoretic display panel, but the disclosure is not limited thereto. The display panel 200 may include a plurality of pixels, and the display panel 200 may include a main display region and a border display region. The border display region may surround the main display region on the display panel 200, but the disclosure is not limited thereto. The pixels in the main display region of display panel 200 may have four color display types, and are driven by the common voltage with a first high common voltage level, a second high common voltage level or a low common voltage level. The first high common voltage level is higher than the second high common voltage level, and the second high common voltage level is higher than the low common voltage level. The pixels in the border display region of display panel 200 may have two color display types, and are driven by the border voltage with a high border voltage level or a low border voltage level. The high border voltage level is higher than the low border voltage level.

In the embodiment of the disclosure, the controller 110 may be a timing controller (TCON). The controller 110 may include a processor and a memory. In the embodiment of the disclosure, the processor may be a field programmable gate array (FPGA), an application-specific integrated circuit (ASIC), or a micro-controller. The memory may be a static random-access memory (SRAM), a dynamic random-access memory (DRAM), a synchronized dynamic random-access memory (SDRAM), or a flash memory.

Figure 2:
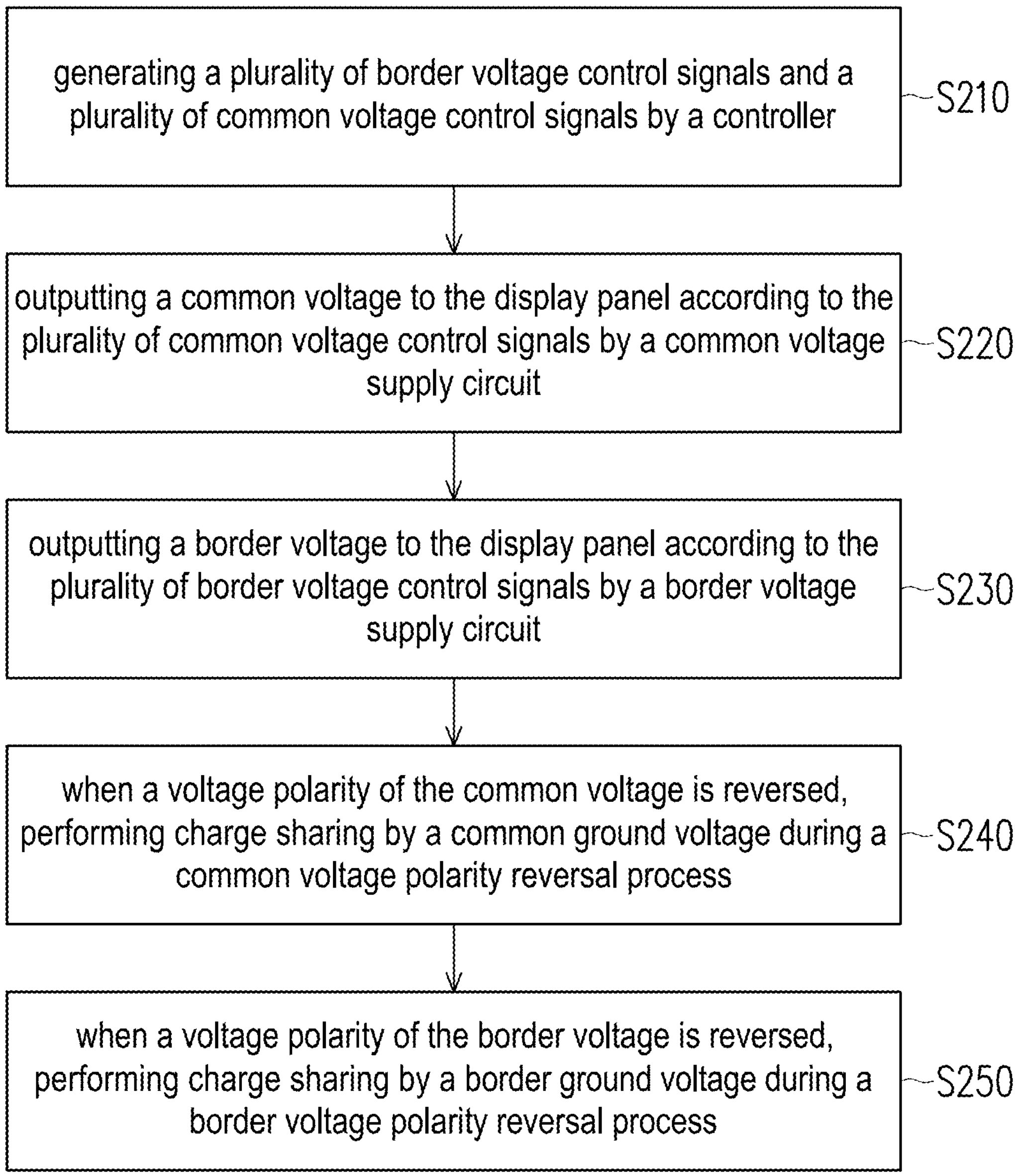
FIG. 2 is a flowchart of a display driving method according to an embodiment of the disclosure.

FIG. 2 is a flowchart of a display driving method according to an embodiment of the disclosure. Referring to FIG. 1 and FIG. 2, the display driving circuit 100 may execute the following steps S210 to S240. In step S210, the controller 110 generates the plurality of border voltage control signals and the plurality of common voltage control signals. In the embodiment of the disclosure, the controller 110 may output the plurality of common voltage control signals and the common ground voltage to the common voltage supply circuit 120. The controller 110 may output the plurality of border voltage control signals and the border ground voltage to the border voltage supply circuit 130. In step S220, the common voltage supply circuit 120 outputs the common voltage to the display panel 200 according to the plurality of common voltage control signals and the common ground voltage. In step S230, the border voltage supply circuit 130 outputs the border voltage to the display panel 200 according to the plurality of border voltage control signals and the border ground voltage.

In step S240, when a voltage polarity of the common voltage is reversed, the common voltage supply circuit 120 performs charge sharing by a common ground voltage during a common voltage polarity reversal process. In step S250, when a voltage polarity of the border voltage is reversed, the border voltage supply circuit 130 performs charge sharing by a border ground voltage during a border voltage polarity reversal process. Therefore, the display driving circuit 100 and the display driving method of the embodiment may effectively reduce a peak current generated by a driving voltage of the display panel 200 occurs voltage polarity reversed.

Figure 3A:
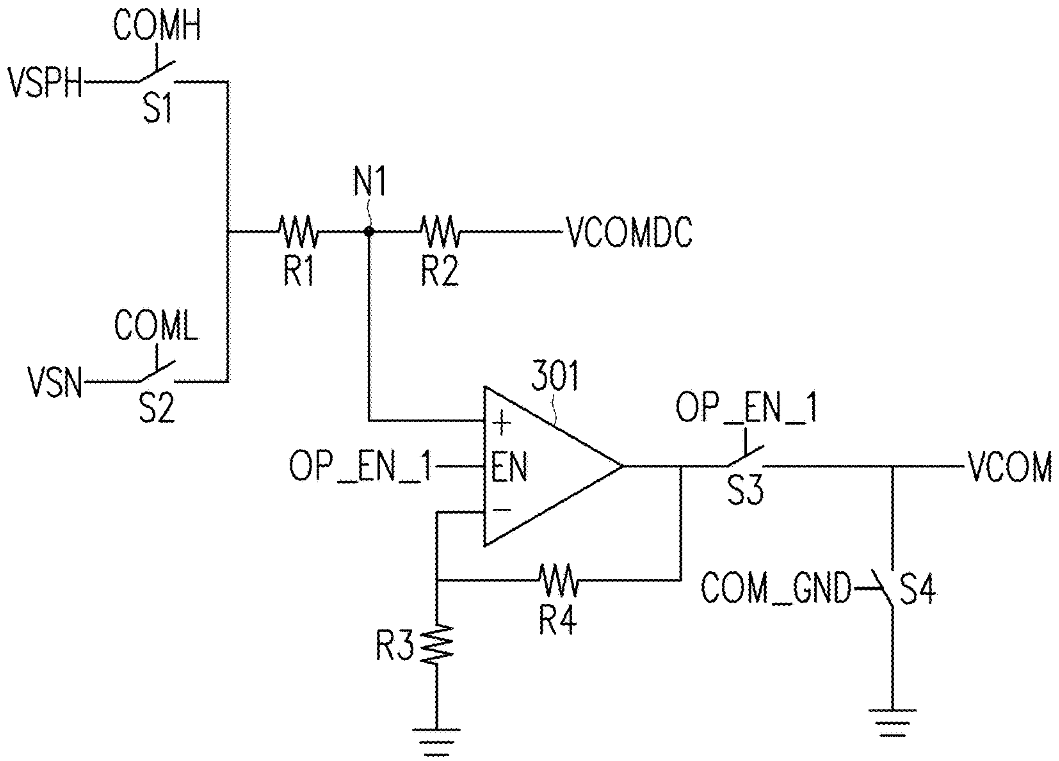
FIGS. 3A and 3B are schematic diagrams of a common voltage supply circuit according to an embodiment of the disclosure.
Figure 3B:
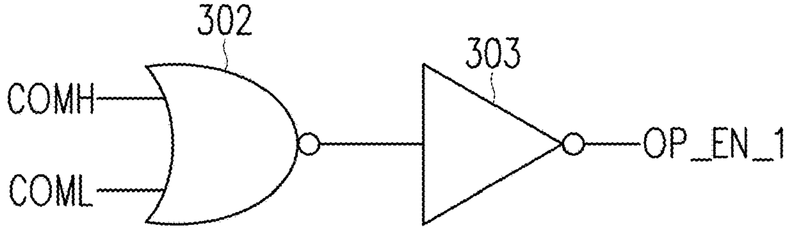

FIGS. 3A and 3B are schematic diagrams of a common voltage supply circuit according to an embodiment of the disclosure. Referring to FIG. 3A, the common voltage supply circuit 120 includes a plurality of switch circuits S1 to S4, a plurality of resistors R1 to R4, and an operational amplifier 301. In the embodiment of the disclosure, the switch circuits S1 to S4 may be N-type transistors, but the disclosure is not limited thereto. In the embodiment of the disclosure, a first terminal of the switch circuit S1 receives a first positive voltage VSPH, and a second terminal of the switch circuit S1 is coupled to a first terminal of the resistor R1. A first terminal of the switch circuit S2 receives a negative voltage VSN, and a second terminal of the switch circuit S2 is coupled to the first terminal of the resistor R1. A second terminal of the resistor R1 is coupled to a node N1. A first terminal of the resistor R2 receives a reference voltage VCOMDC, and a second terminal of the resistor R2 is coupled to the node N1. The reference voltage VCOMDC may be a direct current (DC) voltage or a constant voltage. A first input terminal (e.g. a non-inverting input terminal) of the operational amplifier 301 is coupled to the node N1. A control terminal of the operational amplifier 301 receives an enable signal OP_EN_1. An output terminal of the operational amplifier 301 is coupled to a first terminal of the switch circuit S3, and outputs the common voltage VCOM through the switch circuit S3.

A second terminal of the switch circuit S3 is coupled to a first terminal of the switch circuit S4. A second terminal of the switch circuit S4 is coupled to a ground voltage. A first terminal of the resistor R3 is coupled to a second input terminal (e.g. an inverting input terminal) of the operational amplifier 301. A second terminal of the resistor R3 is coupled to the ground voltage. A first terminal of the resistor R4 is coupled to the output terminal of the operational amplifier 301. A second terminal of the resistor R4 is coupled to the first terminal of the resistor R3 and the second input terminal of the operational amplifier 301.

In the embodiment of the disclosure, the plurality of common voltage control signals may include a high common voltage level control signal COMH, a low common voltage level control signal COML, and a common ground control signal COM_GND. A control terminal of the switch circuit S1 receives the high common voltage level control signal COMH. A control terminal of the switch circuit S2 receives the low common voltage level control signal COML. A control terminal of the switch circuit S3 receives the enable signal OP_EN_1. A control terminal of the switch circuit S4 receives the common ground control signal COM_GND. A control terminal of the operational amplifier 301 also receives the enable signal OP_EN_1.

Referring to FIG. 3B, the common voltage supply circuit 120 further includes a NOR gate (circuit) 302 and an inverter 303. In the embodiment of the disclosure, a first input terminal of the NOR gate 302 receives the high common voltage level control signal COMH, and a second input terminal of the NOR gate 302 receives the low common voltage level control signal COML. An input terminal of the inverter 303 is coupled to an output terminal of the NOR gate 302. An output terminal of the inverter 303 is coupled to the control terminal of the operational amplifier 301 to provide the enable signal OP_EN_1.

Figure 4:
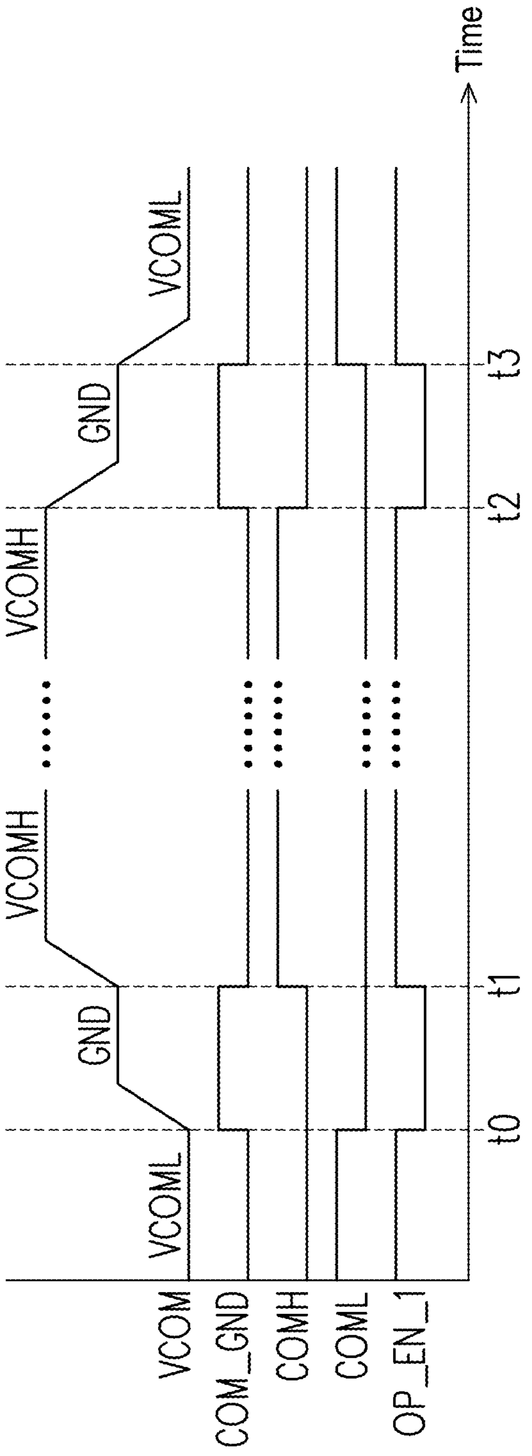
FIG. 4 is a waveform diagram of a plurality of signals and voltages according to an embodiment of the disclosure.

FIG. 4 is a waveform diagram of a plurality of signals and voltages according to an embodiment of the disclosure. Referring to FIG. 1, FIG. 3A to FIG. 4, the waveform changes of the signals and voltages of FIG. 3A and FIG. 3B are shown in FIG. 4. In the embodiment of the disclosure, during the common voltage polarity reversal process, the common voltage supply circuit 120 may change the common voltage VCOM from one of a low common voltage level VCOML and a high common voltage level VCOMH to the common ground voltage level GND, and then change the common voltage VCOM from the common ground voltage level GND to another one of the low common voltage level VCOML and the high common voltage level VCOMH. The high common voltage level VCOMH is higher than the common ground voltage level GND, and the common ground voltage level GND is higher than the low common voltage level VCOML. In one embodiment of the disclosure, the high common voltage level VCOMH may be 13 volts, and the low common voltage level VCOML may be −17 volts, but the disclosure is not limited thereto.

In the embodiment of the disclosure, before time t0, the common ground control signal COM_GND may have the low voltage level, the high common voltage level control signal COMH may have the low voltage level, and the low common voltage level control signal COML may have the high voltage level. Thus, the enable signal OP_EN_1 may be changed to the high voltage level. The switch circuits S1 and S4 are turned-off. The switch circuits S2 and S3 are turned-on. The operational amplifier 301 may output a voltage with the low common voltage level VCOML, so that the common voltage VCOM may have the low common voltage level VCOML.

Then, during a period from time t0 to time t1, when the common voltage supply circuit 120 operates the common voltage polarity reversal process during a VCOM and DATA interval (CDI) period, the common ground control signal COM_GND may be changed to the high voltage level, the high common voltage level control signal COMH may be maintained at the low voltage level, and the low common voltage level control signal COML may be changed to the low voltage level. Thus, the enable signal OP_EN_1 may be changed to the low voltage level. The switch circuits S1 to S3 are turned-off. The switch circuit S4 is turned-on. The switch circuit S4 may provide a voltage with the common ground voltage level GND, so that the common voltage VCOM may have the common ground voltage level GND.

Then, after time t1, the common ground control signal COM_GND may be changed to the low voltage level, the high common voltage level control signal COMH may be changed to the high voltage level, and the low common voltage level control signal COML may be maintained at the low voltage level. Thus, the enable signal OP_EN_1 may be changed to the high voltage level. The switch circuits S2 and S4 are turned-off. The switch circuits S1 and S3 are turned-on. The switch circuit S3 may provide a voltage with the high common voltage level VCOMH, so that the common voltage VCOM may have the high common voltage level VCOMH.

Then, during a period from time t2 to time t3, when the common voltage supply circuit 120 operates the common voltage polarity reversal process during another charge distribution interval period, the common ground control signal COM_GND may be changed to the high voltage level, the high common voltage level control signal COMH may be changed to the low voltage level, and the low common voltage level control signal COML may be maintained at the low voltage level. Thus, the enable signal OP_EN_1 may be changed to the low voltage level. The switch circuits S1 to S3 are turned-off. The switch circuit S4 is turned-on. The switch circuit S4 may provide the voltage with the common ground voltage level GND, so that the common voltage VCOM may have the common ground voltage level GND.

Then, after time t3, the common ground control signal COM_GND may be changed to the low voltage level, the high common voltage level control signal COMH may be maintained at the low voltage level, and the low common voltage level control signal COML may be changed to the high voltage level. Thus, the enable signal OP_EN_1 may be changed to the high voltage level. The switch circuits S1 and S4 are turned-off. The switch circuit S2 and S3 are turned-on. The switch circuit S3 may provide a voltage with the low common voltage level VCOML, so that the common voltage VCOM may have the low common voltage level VCOML.

Therefore, when the common voltage VCOM for driving the display panel 200 occurs voltage polarity reversed, the common voltage supply circuit 120 may effectively reduce a peak current generated by the common voltage VCOM through charge sharing of the common ground voltage level GND.

Figure 5A:
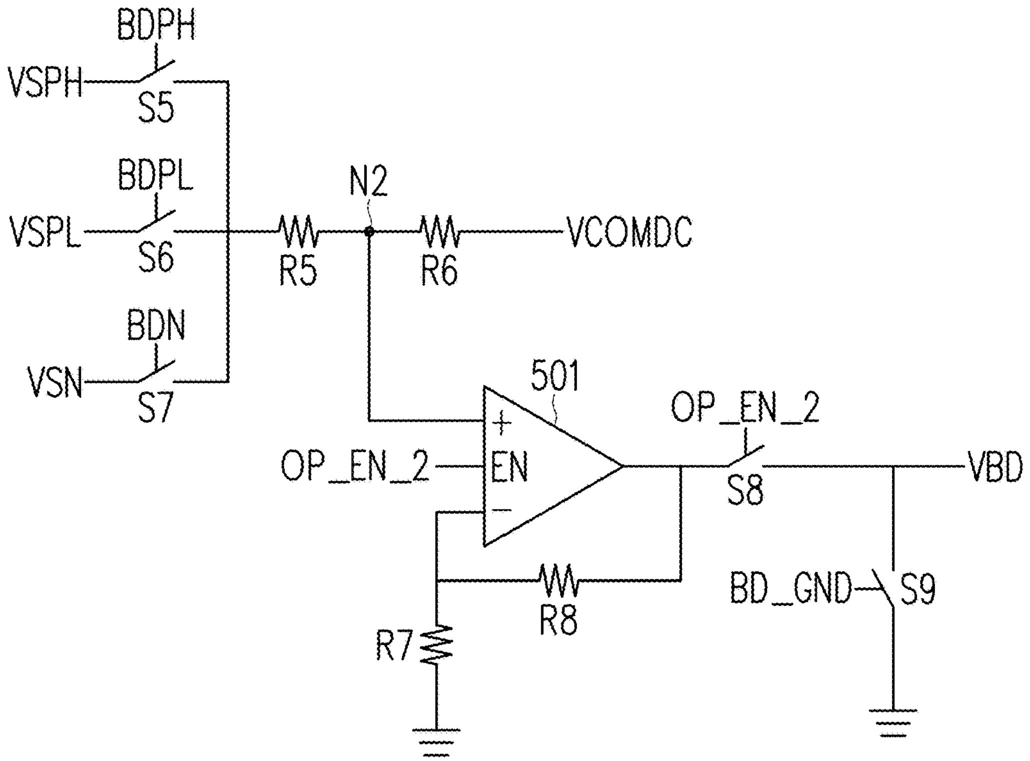
FIGS. 5A and 5B are schematic diagrams of a border voltage supply circuit according to an embodiment of the disclosure.
Figure 5B:
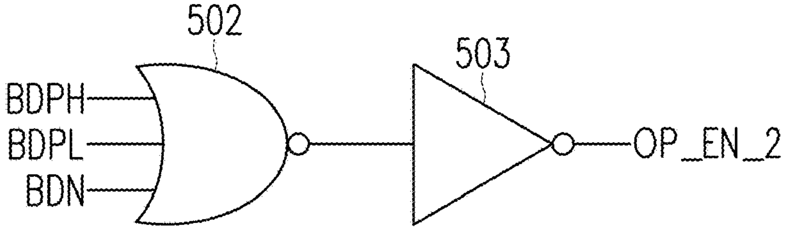

FIGS. 5A and 5B are schematic diagrams of a border voltage supply circuit according to an embodiment of the disclosure. Referring to FIG. 5A, the border voltage supply circuit 130 includes a plurality of switch circuits S5 to S9, a plurality of resistors R5 to R8, and a operational amplifier 501. In the embodiment of the disclosure, the switch circuits S5 to S9 may be N-type transistors, but the disclosure is not limited thereto. The operational amplifier 501 may be operational amplifier. In the embodiment of the disclosure, a first terminal of the switch circuit S5 receives a first positive voltage VSPH, and a second terminal of the switch circuit S5 is coupled to a first terminal of the resistor R5. A first terminal of the switch circuit S6 receives a second positive voltage VSPH, and a second terminal of the switch circuit S6 is coupled to the first terminal of the resistor R5. A first terminal of the switch circuit S7 receives a negative voltage VSN, and a second terminal of the switch circuit S7 is coupled to the first terminal of the resistor R5. A second terminal of the resistor R5 is coupled to a node N2. A first terminal of the resistor R6 receives a reference voltage VCOMDC, and a second terminal of the resistor R6 is coupled to the node N2. The reference voltage VCOMDC may be a direct current (DC) voltage or a constant voltage. A first input terminal (e.g. a non-inverting input terminal) of the operational amplifier 501 is coupled to the node N2. A control terminal of the operational amplifier 501 receives an enable signal OP_EN_2. An output terminal of the operational amplifier 501 is coupled to a first terminal of the switch circuit S8, and outputs the border voltage VBD through the switch circuit S8.

A second terminal of the switch circuit S8 is coupled to a first terminal of the switch circuit S9. A second terminal of the switch circuit S9 is coupled to a ground voltage. A first terminal of the resistor R7 is coupled to a second input terminal (e.g. an inverting input terminal) of the operational amplifier 501. A second terminal of the resistor R7 is coupled to the ground voltage. A first terminal of the resistor R8 is coupled to the output terminal of the operational amplifier 501. A second terminal of the resistor R8 is coupled to the first terminal of the resistor R7 and the second input terminal of the operational amplifier 501.

In the embodiment of the disclosure, the plurality of border voltage control signals may include a first high border voltage level control signal BDPH, a second high border voltage level control signal BDPL, a low border voltage level control signal BDN, and a border ground control signal BD_GND. A control terminal of the switch circuit S5 receives the first high border voltage level control signal BDPH. A control terminal of the switch circuit S6 receives the second high border voltage level control signal BDPL. A control terminal of the switch circuit S7 receives the low border voltage level control signal BDN. A control terminal of the switch circuit S8 receives the enable signal OP_EN_2. A control terminal of the switch circuit S9 receives the border ground control signal BD_GND. A control terminal of the operational amplifier 501 also receives the enable signal OP_EN_2.

Referring to FIG. 5B, the border voltage supply circuit 130 further includes a NOR gate (circuit) 502 and an inverter 503. In the embodiment of the disclosure, a first input terminal of the NOR gate 502 receives the first high border voltage level control signal BDPH, a second input terminal of the NOR gate 502 receives the second high border voltage level control signal BDPL, and a third input terminal of the NOR gate 502 receives the low border voltage level control signal BDN. An input terminal of the inverter 503 is coupled to an output terminal of the NOR gate 502. An output terminal of the inverter 503 is coupled to the control terminal of the operational amplifier 501 to provide the enable signal OP_EN_2.

Figure 6:
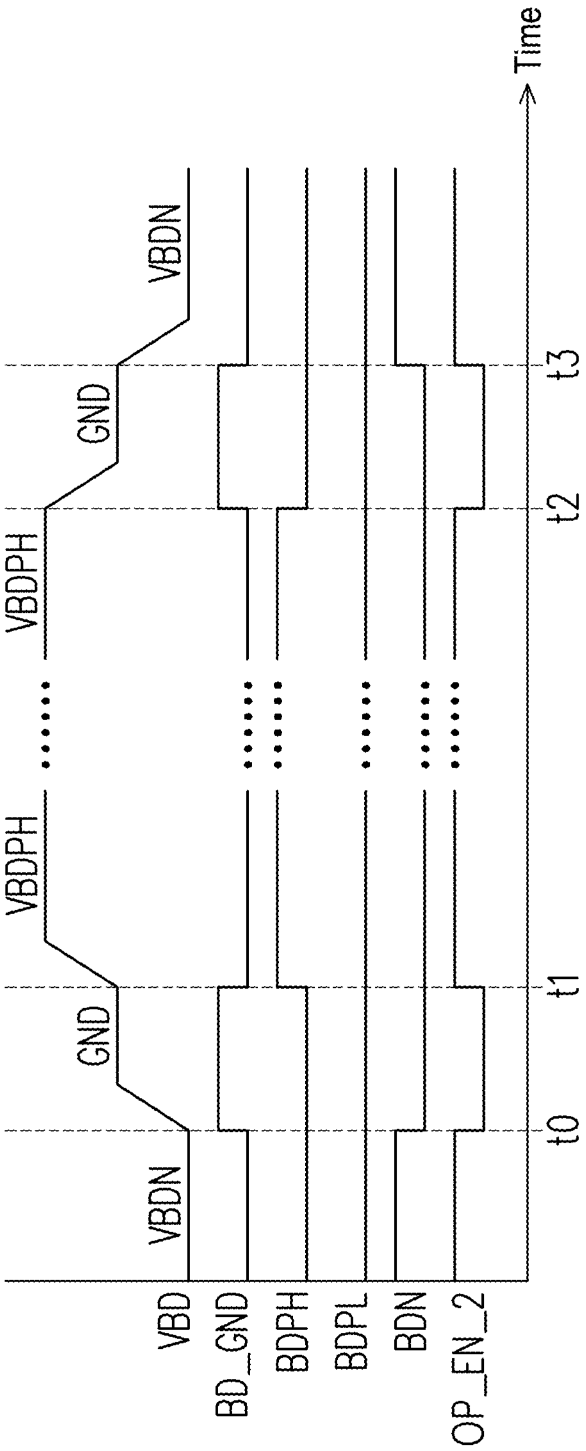
FIG. 6 is a waveform diagram of a plurality of signals and voltages according to an embodiment of the disclosure.

FIG. 6 is a waveform diagram of a plurality of signals and voltages according to an embodiment of the disclosure. Referring to FIG. 1, FIG. 5A to FIG. 6, the waveform changes of the signals and voltages of FIG. 5A and FIG. 5B are shown in FIG. 6. In the embodiment of the disclosure, during the border voltage polarity reversal process, the border voltage supply circuit 130 may change the border voltage VBD from one of a low border voltage level VBDN and a first high border voltage level VBDPH to the border ground voltage level GND, and then change the border voltage VBD from the border ground voltage level GND to another one of the low border voltage level VBDN and the first high border voltage level VBDPH. The first high border voltage level VBDPH is higher than the border ground voltage level GND, and the border ground voltage level GND is higher than the low border voltage level VBDN. In one embodiment of the disclosure, the first high border voltage level VBDPH may be 13 volts, and the low border voltage level VBDN may be −17 volts, but the disclosure is not limited thereto.

In the embodiment of the disclosure, before time t0, the border ground control signal BD_GND may have the low voltage level, the first high border voltage level control signal BDPH may have the low voltage level, the second high border voltage level control signal BDPL may have the low voltage level, and the low border voltage level control signal BDN may have the high voltage level. Thus, the enable signal OP_EN_2 may be changed to the high voltage level. The switch circuits S5, S6 and S9 are turned-off. The switch circuits S7 and S8 are turned-on. The operational amplifier 501 may output a voltage with the low border voltage level VBDN, so that the border voltage VBD may have the low border voltage level VBDN.

Then, during a period from time t0 to time t1, when the border voltage supply circuit 130 operates the border voltage polarity reversal process during a power switch time (PST) period, the border ground control signal BD_GND may be changed to the high voltage level, the first high border voltage level control signal BDPH may be maintained at the low voltage level, the second high border voltage level control signal BDPL may be maintained at the low voltage level, and the low border voltage level control signal BDN may be changed to the low voltage level. Thus, the enable signal OP_EN_2 may be changed to the low voltage level. The switch circuits S5 to S8 are turned-off. The switch circuit S9 is turned-on. The switch circuit S9 may provide a voltage with the border ground voltage level GND, so that the border voltage VBD may have the border ground voltage level GND.

Then, after time t1, the border ground control signal BD_GND may be changed to the low voltage level, the first high border voltage level control signal BDPH may be changed to the high voltage level, the second high border voltage level control signal BDPL may be maintained at the low voltage level, and the low border voltage level control signal BDN may be maintained at the low voltage level. Thus, the enable signal OP_EN_2 may be changed to the high voltage level. The switch circuits S6, S7 and S9 are turned-off. The switch circuits S5 and S8 are turned-on. The switch circuit S8 may provide a voltage with the first high border voltage level VBDPH, so that the border voltage VBD may have the first high border voltage level VBDPH.

Then, during a period from time t2 to time t3, when the border voltage supply circuit 130 operates the border voltage polarity reversal process during another pre-charge start timing period, the border ground control signal BD_GND may be changed to the high voltage level, the first high border voltage level control signal BDPH may be changed to the low voltage level, the second high border voltage level control signal BDPL may be maintained at the low voltage level, and the low border voltage level control signal BDN may be maintained at the low voltage level. Thus, the enable signal OP_EN_2 may be changed to the low voltage level. The switch circuits S5 to S8 are turned-off. The switch circuit S9 is turned-on. The switch circuit S9 may provide the voltage with the border ground voltage level GND, so that the border voltage VBD may have the border ground voltage level GND.

Then, after time t3, the border ground control signal BD_GND may be changed to the low voltage level, the first high border voltage level control signal BDPH may be maintained at the low voltage level, the second high border voltage level control signal BDPL may be maintained at the low voltage level, and the low border voltage level control signal BDN may be changed to the high voltage level. Thus, the enable signal OP_EN_2 may be changed to the high voltage level. The switch circuits S5, S6 and S9 are turned-off. The switch circuit S7 and S8 are turned-on. The switch circuit S8 may provide a voltage with the low border voltage level VBDN, so that the border voltage VBD may have the low border voltage level VBDN.

Therefore, when the border voltage VBD for driving the display panel 200 occurs voltage polarity reversed, the border voltage supply circuit 130 may effectively reduce a peak current generated by the border voltage VBD through charge sharing of the border ground voltage level GND.

Figure 7:
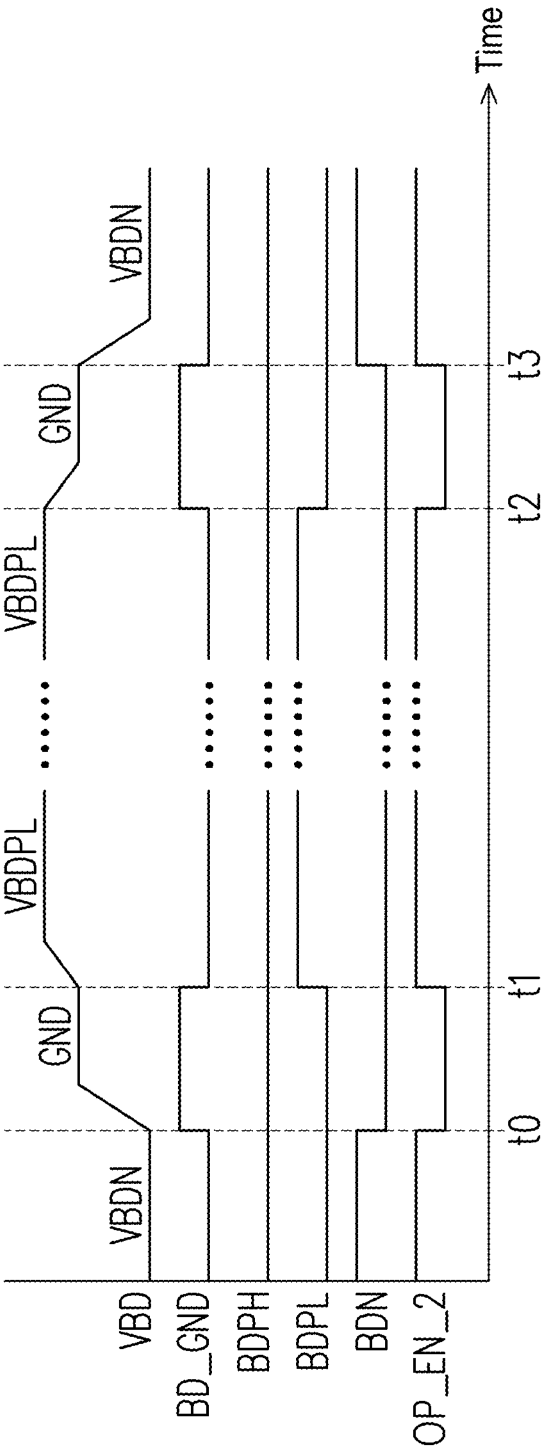
FIG. 7 is a waveform diagram of a plurality of signals and voltages according to another embodiment of the disclosure.

FIG. 7 is a waveform diagram of a plurality of signals and voltages according to another embodiment of the disclosure. Referring to FIG. 1, FIG. 5A, FIG. 5B and FIG. 7, the waveform changes of the signals and voltages of FIG. 5A and FIG. 5B are shown in FIG. 7. In the embodiment of the disclosure, during the border voltage polarity reversal process, the border voltage supply circuit 130 may change the border voltage VBD from one of a low border voltage level VBDN and a second high border voltage level VBDPL to the border ground voltage level GND, and then change the border voltage VBD from the border ground voltage level GND to another one of the low border voltage level VBDN and the second high border voltage level VBDPL. The second high border voltage level VBDPL is higher than the border ground voltage level GND, and the border ground voltage level GND is higher than the low border voltage level VBDN. The first high border voltage level VBDPH is higher than the second high border voltage level VBDPL. In one embodiment of the disclosure, the first high border voltage level VBDPH may be 13 volts, the second high border voltage level VBDPL may be 6 volts, and the low border voltage level VBDN may be −17 volts, but the disclosure is not limited thereto.

In the embodiment of the disclosure, before time t0, the border ground control signal BD_GND may have the low voltage level, the first high border voltage level control signal BDPH may have the low voltage level, the second high border voltage level control signal BDPL may have the low voltage level, and the low border voltage level control signal BDN may have the high voltage level. Thus, the enable signal OP_EN_2 may be changed to the high voltage level. The switch circuits S5, S6 and S9 are turned-off. The switch circuits S7 and S8 are turned-on. The operational amplifier 501 may output a voltage with the low border voltage level VBDN, so that the border voltage VBD may have the low border voltage level VBDN.

Then, during a period from time t0 to time t1, when the border voltage supply circuit 130 operates the border voltage polarity reversal process during a power switch time (PST) period, the border ground control signal BD_GND may be changed to the high voltage level, the first high border voltage level control signal BDPH may be maintained at the low voltage level, the second high border voltage level control signal BDPL may be maintained at the low voltage level, and the low border voltage level control signal BDN may be changed to the low voltage level. Thus, the enable signal OP_EN_2 may be changed to the low voltage level. The switch circuits S5 to S8 are turned-off. The switch circuit S9 is turned-on. The switch circuit S9 may provide a voltage with the border ground voltage level GND, so that the border voltage VBD may have the border ground voltage level GND.

Then, after time t1, the border ground control signal BD_GND may be changed to the low voltage level, the first high border voltage level control signal BDPH may be maintained at the low voltage level, the second high border voltage level control signal BDPL may be changed to the high voltage level, and the low border voltage level control signal BDN may be maintained at the low voltage level. Thus, the enable signal OP_EN_2 may be changed to the high voltage level. The switch circuits S5, S7 and S9 are turned-off. The switch circuits S6 and S8 are turned-on. The switch circuit S8 may provide a voltage with the second high border voltage level VBDPL, so that the border voltage VBD may have the second high border voltage level VBDPL.

Then, during a period from time t2 to time t3, when the border voltage supply circuit 130 operates the border voltage polarity reversal process during another pre-charge start timing period, the border ground control signal BD_GND may be changed to the high voltage level, the first high border voltage level control signal BDPH may be maintained at the low voltage level, the second high border voltage level control signal BDPL may be changed to the low voltage level, and the low border voltage level control signal BDN may be maintained at the low voltage level. Thus, the enable signal OP_EN_2 may be changed to the low voltage level. The switch circuits S5 to S8 are turned-off. The switch circuit S9 is turned-on. The switch circuit S9 may provide the voltage with the border ground voltage level GND, so that the border voltage VBD may have the border ground voltage level GND.

Then, after time t3, the border ground control signal BD_GND may be changed to the low voltage level, the first high border voltage level control signal BDPH may be maintained at the low voltage level, the second high border voltage level control signal BDPL may be maintained at the low voltage level, and the low border voltage level control signal BDN may be changed to the high voltage level. Thus, the enable signal OP_EN_2 may be changed to the high voltage level. The switch circuits S5, S6 and S9 are turned-off. The switch circuit S7 and S8 are turned-on. The switch circuit S8 may provide a voltage with the low border voltage level VBDN, so that the border voltage VBD may have the low border voltage level VBDN.

Therefore, when the border voltage VBD for driving the display panel 200 occurs voltage polarity reversed, the border voltage supply circuit 130 may effectively reduce a peak current generated by the border voltage VBD through charge sharing of the border ground voltage level GND.

In summary, the display driving device and the display driving method of the disclosure may effectively reduce the peak current generated by the voltage polarity reversal of the common voltage or the border voltage for driving the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving circuit, comprising:

a controller, configured to generate a plurality of border voltage control signals and a plurality of common voltage control signals;

a common voltage supply circuit, coupled to the controller and a display panel, and configured to output a common voltage to the display panel according to the plurality of common voltage control signals; and a border voltage supply circuit, coupled to the controller and the display panel, and configured to output a border voltage to the display panel according to the plurality of border voltage control signals, wherein when the common voltage supply circuit determines that a voltage polarity of the common voltage is reversed according to the plurality of common voltage control signals, the common voltage supply circuit performs charge sharing by a common ground voltage during a common voltage polarity reversal process, wherein the plurality of common voltage control signals comprises a high common voltage level control signal and a low common voltage level control signal, and the common voltage supply circuit comprises:

a first operational amplifier configured to output the common voltage based on a first enable signal, and a logic circuit configured to generate the first enable signal for the operational amplifier based on the high common voltage level control signal and the low common voltage level control signal, wherein when the border voltage supply circuit determines that a voltage polarity of the border voltage is reversed according to the plurality of border voltage control signals, the border voltage supply circuit performs charge sharing by a border ground voltage during a border voltage polarity reversal process, wherein the common voltage supply circuit further comprises:

a first switch circuit, wherein a first terminal of the first switch circuit receives a positive voltage, a control terminal of the first switch circuit receives the high common voltage level control signal;

a second switch circuit, wherein a first terminal of the second switch circuit receives a negative voltage, a control terminal of the second switch circuit receives the low common voltage level control signal;

a first resistor, wherein a first terminal of the first resistor is coupled to a plurality of second terminals of the first switch circuit and the second switch circuit, and a second terminal of the first resistor is coupled to a first node; and a second resistor, wherein a first terminal of the second resistor receives a first reference voltage, and a second terminal of the second resistor is coupled to the first node;

wherein a first input terminal of the first operational amplifier is coupled to the first node, a control terminal of the first operational amplifier receives the first enable signal, and an output terminal of the first operational amplifier outputs the common voltage.

2. The display driving circuit according to claim 1, wherein during the common voltage polarity reversal process, the common voltage supply circuit is configured to change the common voltage from one of a low common voltage level and a high common voltage level to the common ground voltage level, and then change the common voltage from the common ground voltage level to another one of the low common voltage level and the high common voltage level, wherein the high common voltage level is higher than the common ground voltage level, and the common ground voltage level is higher than the low common voltage level.

3. The display driving circuit according to claim 1, wherein during the border voltage polarity reversal process, the border voltage supply circuit is configured to change the border ground voltage from a low border voltage level to the border ground voltage, and then change the border voltage from the border ground voltage to a first high border voltage level or a second high border voltage level, wherein the first high border voltage level is higher than the second high border voltage level, the second high border voltage level is higher than the border ground voltage, and the border ground voltage is higher than the low border voltage level.

4. The display driving circuit according to claim 1, wherein during the border voltage polarity reversal process, the border voltage supply circuit is configured to change the border ground voltage from a first high border voltage level or a second high border voltage level to the border ground voltage, and then change the border voltage from the border ground voltage to a low border voltage level, wherein the first high border voltage level is higher than the second high border voltage level, the second high border voltage level is higher than the border ground voltage, and the border ground voltage is higher than the low border voltage level.

5. The display driving circuit according to claim 1, wherein the logic circuit of the common voltage supply circuit comprises:

a first NOR gate, wherein a first input terminal of the first NOR gate receives the high common voltage level control signal, and a second input terminal of the first NOR gate receives the low common voltage level control signal;

a first inverter, wherein an input terminal of the first inverter is coupled to an output terminal of the first NOR gate, an output terminal of the first inverter is coupled to the control terminal of the first operational amplifier to provide the first enable signal.

6. The display driving circuit according to claim 1, wherein the plurality of border voltage control signals comprises a first high border voltage level control signal, a second high border voltage level control signal and a low border voltage level control signal, and the border voltage supply circuit comprises:

a third switch circuit, wherein a first terminal of the third switch circuit receives a first positive voltage, a control terminal of the third switch circuit receives the first high border voltage level control signal;

a fourth switch circuit, wherein a first terminal of the fourth switch circuit receives a second positive voltage, a control terminal of the fourth switch circuit receives the second high border voltage level control signal;

a fifth switch circuit, wherein a first terminal of the fifth switch circuit receives a negative voltage, a control terminal of the fifth switch circuit receives the low border voltage level control signal;

a third resistor, wherein a first terminal of the third resistor is coupled to a plurality of second terminals of the third switch circuit, the fourth switch circuit and the fifth switch circuit, and a second terminal of the third resistor is coupled to a second node;

a fourth resistor, wherein a first terminal of the fourth resistor receives a second reference voltage, and a second terminal of the fourth resistor is coupled to the second node; and a second operational amplifier, wherein a first input terminal of the second operational amplifier is coupled to the second node, a control terminal of the second operational amplifier receives a second enable signal, and an output terminal of the second operational amplifier outputs the border voltage, wherein the first positive voltage is higher than the second positive voltage.

7. The display driving circuit according to claim 6, wherein the border voltage supply circuit further comprises:

a second NOR gate, wherein a first input terminal of the second NOR gate receives the first high border voltage level control signal, a second input terminal of the second NOR gate receives the second high border voltage level control signal, and a third input terminal of the second NOR gate receives the low common voltage level control signal;

a second inverter, wherein an input terminal of the second inverter is coupled to an output terminal of the second NOR gate, an output terminal of the second inverter is coupled to the control terminal of the second operational amplifier to provide the second enable signal.

8. The display driving circuit according to claim 1, wherein the common voltage supply circuit operates the common voltage polarity reversal process during a VCOM and DATA interval period.

9. The display driving circuit according to claim 1, wherein the border voltage supply circuit operates the border voltage polarity reversal process during a power switch time period.

10. The display driving circuit according to claim 1, wherein the controller is a timing controller.

11. A display driving method, comprising:

generating a plurality of border voltage control signals and a plurality of common voltage control signals by a controller;

outputting a common voltage to the display panel according to the plurality of common voltage control signals by a common voltage supply circuit;

outputting a border voltage to the display panel according to the plurality of border voltage control signals by a border voltage supply circuit; and when a voltage polarity of the common voltage is reversed, performing charge sharing by a common ground voltage during a common voltage polarity reversal process, wherein the plurality of common voltage control signals comprises a high common voltage level control signal and a low common voltage level control signal;

the common voltage is output by a first operational amplifier based on a first enable signal, and the first enable signal for the operational amplifier is generated by a logic circuit based on the high common voltage level control signal and the low common voltage level control signal, wherein the display driving method further comprising: when a voltage polarity of the border voltage is reversed, performing charge sharing by a border ground voltage during a border voltage polarity reversal process, wherein the common voltage supply circuit comprises:

a first switch circuit, wherein a first terminal of the first switch circuit receives a positive voltage, a control terminal of the first switch circuit receives the high common voltage level control signal;

a second switch circuit, wherein a first terminal of the second switch circuit receives a negative voltage, a control terminal of the second switch circuit receives the low common voltage level control signal;

a first resistor, wherein a first terminal of the first resistor is coupled to a plurality of second terminals of the first switch circuit and the second switch circuit, and a second terminal of the first resistor is coupled to a first node; and a second resistor, wherein a first terminal of the second resistor receives a first reference voltage, and a second terminal of the second resistor is coupled to the first node;

wherein a first input terminal of the first operational amplifier is coupled to the first node, a control terminal of the first operational amplifier receives the first enable signal, and an output terminal of the first operational amplifier outputs the common voltage.

12. The display driving method according to claim 11, wherein the step of performing charge sharing by the common ground voltage comprises:

during the common voltage polarity reversal process, changing the common voltage from one of a low common voltage level and a high common voltage level to the common ground voltage level, and then changing the common voltage from the common ground voltage level to another one of the low common voltage level and the high common voltage level by the common voltage supply circuit, wherein the high common voltage level is higher than the common ground voltage level, and the common ground voltage level is higher than the low common voltage level.

13. The display driving method according to claim 11, wherein the step of performing charge sharing by the border ground voltage comprises:

during the border voltage polarity reversal process, changing the border ground voltage from a low border voltage level to the border ground voltage, and then change the border voltage from the border ground voltage to a first high border voltage level or a second high border voltage level by the border voltage supply circuit, wherein the first high border voltage level is higher than the second high border voltage level, the second high border voltage level is higher than the border ground voltage, and the border ground voltage is higher than the low border voltage level.

14. The display driving method according to claim 11, wherein the step of performing charge sharing by the border ground voltage comprises:

during the border voltage polarity reversal process, changing the border ground voltage from a first high border voltage level or a second high border voltage level to the border ground voltage, and then change the border voltage from the border ground voltage to a low border voltage level by the border voltage supply circuit, wherein the first high border voltage level is higher than the second high border voltage level, the second high border voltage level is higher than the border ground voltage, and the border ground voltage is higher than the low border voltage level.

15. The display driving method according to claim 11, wherein the common voltage supply circuit operates the common voltage polarity reversal process during a charge distribution interval period.

16. The display driving method according to claim 11, wherein the border voltage supply circuit operates the border voltage polarity reversal process during a pre-charge start timing period.

17. The display driving method according to claim 11, wherein the controller is a timing controller.

* * * * *